UNITED STATES PATENT OFFICE 2,130,382

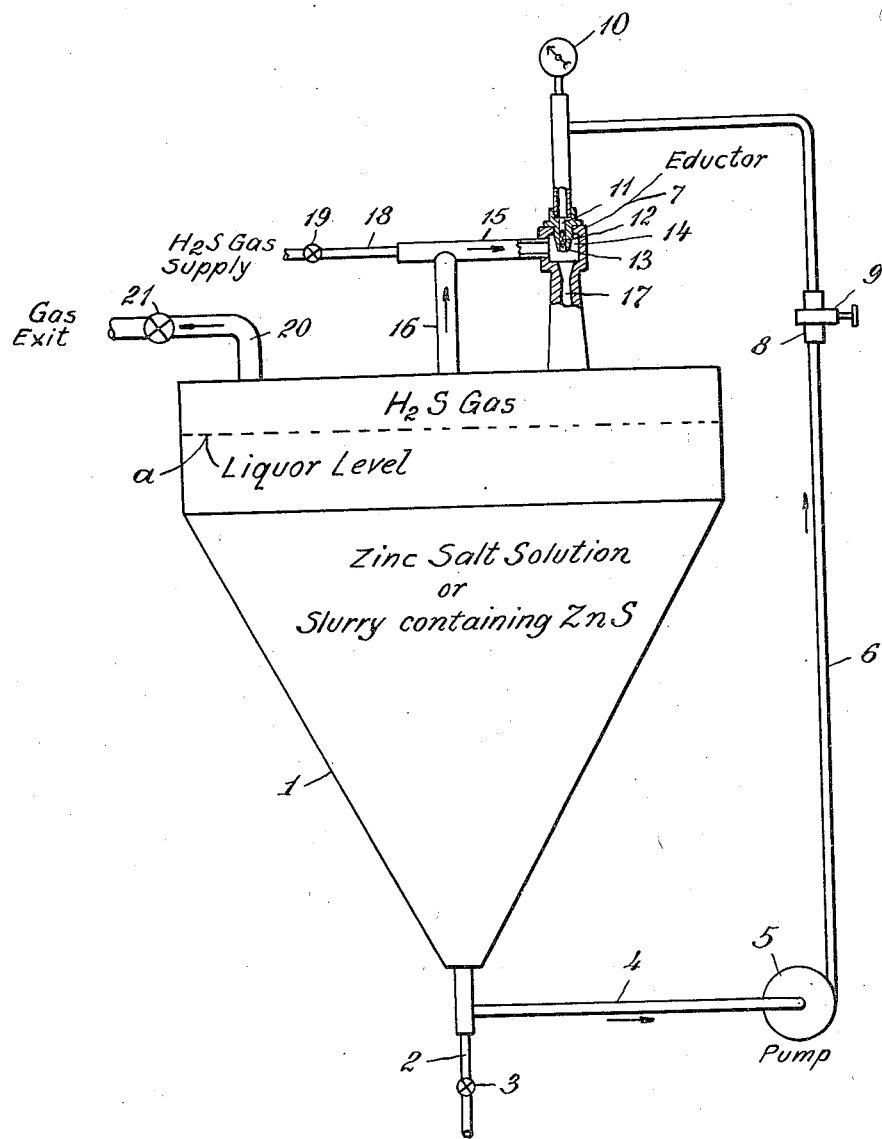

PRECIPITATING ZINC SULPHIDE

Lewis Covell Copeland and John Reid Stone, Palmerton, Pa., assignors to The New Jersey Zinc Company, New York, N. Y., a corporation of New Jersey Application April 1, 1937, Serial No. 134,237

5 Claims. (Cl. 23—135)

The present invention relates to the precipitation of zinc sulphide in a batch operation in which a zinc salt solution is brought into contact with hydrogen sulphide gas, and has for its object the provision of certain improvements in such operations. More particularly, the invention contemplates an improved method of precipitating zinc sulphide from separate batches of zinc salt solutions (such as zinc sulphate solutions) by means of hydrogen sulphide gas in such fashion as to obtain a relatively slow settling crude precipitate that yields a zinc sulphide pigment of high quality when finished by conventional practices (including muffling, quenching etc.).

In its broad aspect the invention contemplates introducing the zinc salt solution into a precipitating chamber in such a manner that the entering solution is afforded little opportunity for reacting with any hydrogen sulphide gas in the chamber, and then (when the entire batch of zinc salt solution has been so introduced into the chamber) circulating the liquid content of the chamber in the course of which the liquid is repeatedly sprayed through hydrogen sulphide gas until the zinc salt content of the initial solution has been depleted to the desired extent. Thus, the invention contemplates starting the contact of zinc salt solution and hydrogen sulphide gas by mixing by means of a vigorous spray of the solution so as to avoid, as nearly as possible, any reaction taking place by the slow introduction of hydrogen sulphide gas into the zinc salt solution before the mixing operation begins. A further feature of the invention involves removing from the chamber after each batch operation the reaction products of the precipitation, thereby avoiding in the succeeding batch operation conditions unfavorable to the production of a relatively slow settling crude precipitate. A still further feature of the invention involves controlling the settling rate of the resulting crude zinc sulphide precipitate by regulating the time required to attain the desired depletion of the zinc salt content of the initial solution or by regulating the zinc salt content or concentration of the initial solution.

In carrying out the invention, a batch of zinc salt solution (such as zinc sulphate solution) is brought into contact with hydrogen sulphide gas of controlled H₂S partial pressure (for example, a partial pressure of at least one-half atmosphere which may be obtained by using gas at atmospheric pressure containing at least 50% H₂S by volume) by vigorously spraying the zinc salt solution through the hydrogen sulphide gas and limiting the contact of the zinc salt solution with hydrogen sulphide gas to the period of vigorous spraying. Various procedures are hereinafter described for so limiting the contact of the zinc salt solution with hydrogen sulphide gas to the period of vigorous spraying. After each operation, the precipitating chamber is washed or rinsed to remove the reaction products, so that the chamber is substantially free of the reaction products of the preceding operation when the next batch of zinc salt solution is introduced. Control of the settling rate of the resulting crude zinc sulphide precipitate may be attained in various ways as more particularly described hereinafter.

We have discovered that if the zinc salt solution is first brought into contact with hydrogen sulphide gas with only moderate agitation, as for example by filling a precipitating chamber containing an atmosphere of hydrogen sulphide gas by pouring the zinc salt solution through such atmosphere, an appreciable reaction takes place, and a quantity of sulphuric acid and precipitated zinc sulphide is formed, and the subsequent zinc sulphide precipitated, in the presence of these products of the first reaction, during an intensive mixing of zinc salt solution with hydrogen sulphide gas tends to form coarse aggregated particles with an excessively high settling rate. Such a crude precipitate, with excessively high settling rate, yields an inferior grade of pigment with respect to optical properties such as tinting strength when finished by conventional practices. A probable explanation of the formation of precipitate with high settling rate when the main precipitation is carried out in the presence of reaction products initially formed without vigorous agitation is as follows:—In the reaction ZnSO₄+H₂S=ZnS+H₂SO₄, the sulphuric acid formed tends to inhibit the reaction in a manner that is dependent on its concentration in the reacting liquid, while the zinc sulphide precipitated tends to accelerate the reaction in a manner that is not only dependent on the concentration of the precipitate but also on those specific physical and chemical characteristics of the precipitate which are determined by the method of precipitation. The retarding effect on the reaction of the sulphuric acid formed is probably an expression of the well-known mass action law. The zinc sulphide precipitated would not be expected to have a retarding effect on the reaction from mass action law considerations because of its very low solubility. Moreover, it appears likely that hydrogen sulphide may be strongly adsorbed on the surfaces of precipitated zinc sulphide particles and that in this condition it is a more powerful precipitating reagent than in the free state (gaseous or dissolved) and thus the promotive action of precipitated zinc sulphide is a function of its particle size, degree of dispersion and specific adsorption. Whatever the mechanism of this promoting reaction of zinc sulphide precipitate may be, it has been clearly demonstrated that it is strongly dependent upon the method by which the zinc sulphide was precipitated. It may thus be postulated, that when the main precipitation is carried out in the presence of reaction products, initially formed without viorous agitation, the acid that is in solution has it normal effect of retarding the reaction, while the zinc sulphide precipitate that is present does not accelerate the reaction to the same extent as an equal amount of zinc sulphide precipitated under conditions of vigorous mixing. The net effect is a retardation of the reaction and so the product obtained, when the main precipitation is completed, is the result of a retarded reaction, which would account for its high settling rate and coarse aggregated particles. It has also been demonstrated that the particles of precipitate initially formed without vigorous agitation can act as nuclei for the independent growth of undesirably large particles, and this factor, in addition to the hereinbefore discussed factor which causes the major effect, also results in the inclusion in the resulting precipitate of some undesirable product. It is to be understood that the present invention is not to be restricted or limited by the foregoing theoretical explanations.

The zinc salt solution freshly charged into a precipitating chamber should not be allowed to come into contact with residual precipitate or acid from the treatment of a previous batch in the chamber. To this end the precipitating chamber is thoroughly washed or rinsed with water after each precipitating operation and prior to the introduction of the next batch of zinc salt solution.

The single figure of the accompanying drawing diagrammatically illustrates a suitable apparatus for the practice of the invention.

The apparatus illustrated in the drawing comprises a cylindrical precipitating chamber 1 having a conical lower portion. A pipe 2 communicates with the bottom of the chamber and is equipped with a valve 3 below the junction of the pipe 2 with a branch pipe 4. The branch pipe 4 connects the pipe 2 with the suction (inlet) side of a pump 5. The pressure (discharge) side of the pump 5 is connected by a pipe 6 to a Venturi tube eductor 7 communicating with the upper portion of the chamber 1. The pipe 6 is equipped with a rubber hose segment 8 provided with a pinch valve 9 for controlling the pressure in that portion of the pipe 6 between the pinch valve and the Venturi tube eductor, and a pressure gauge 10 is operatively associated with this portion of the pipe 6 for indicating the pressure prevailing therein.

The upper depending end of the pipe 6 communicates with a duct 11 in the upper part of the Venturi tube eductor. A spiral baffle 12 is positioned in the duct 11 to impart a swirling motion to the liquid flowing therethrough. The duct 11 terminates in a discharge nozzle 13 in a gas chamber 14 connected by pipes 15 and 16 to the upper portion of the chamber but above the line of normal slurry or liquid level $a$ therein. The nozzle 13 is positioned concentrically above a Venturi tube 17 depending from the gas chamber 14 and communicating with the upper portion of the precipitating chamber.

A pipe 18 having a valve 19 connects the pipe 15 to an appropriate source of hydrogen sulphide gas. A pipe 20 having a valve 21 communicates with the top of the chamber 1, and permits the escape from the chamber of excess hydrogen sulphide gas and of any diluting gaseous impurities that may accumulate as a result of the absorption of hydrogen sulphide gas in the course of the precipitating operation.

In practicing the invention in the apparatus illustrated in the drawing, the chamber 1 together with the connected gas pipes 15 and 16 and the Venturi tube eductor 7 are filled with an atmosphere of concentrated hydrogen sulphide gas (containing for example 95% $H_2S$) through the gas supply pipe 18. Any residual precipitate and acid from the treatment of a previous batch of solution are carefully removed from the chamber 1 by washing or rinsing with water. An aqueous solution of zinc sulphate (or other suitable zinc salt) is then introduced into the chamber through the bottom pipe 2 in such a manner that no intimate contact (as for example by the formation of bubbles or froth) occurs between the entering solution and the hydrogen sulphide gas in the chamber. In particular, the solution should be introduced smoothly, that is to say, not with such force as to form a fountain or atomize the solution into the gas in the chamber. Thus, there is only a slight and negligible formation of zinc sulphide precipitate in the zinc sulphate solution during its introduction into the chamber. When the chamber has been filled to an appropriate level (indicated by $a$ in the drawing), the valve 3 in the pipe 2 is closed and the pump 5 is started. The pump withdraws zinc sulphate solution from the chamber through the pipe 4, and forces the solution through the pipe 6 to the Venturi tube eductor 7, and in this manner continuously circulates the liquid content of the chamber through the Venturi tube eductor. The Venturi tube eductor entrains hydrogen sulphide gas through the pipe 15 and mixes it with the zinc sulphate solution (in the circulating liquid) so that a mixture of zinc sulphate solution and hydrogen sulphide gas is discharged into the top of the chamber. The pipe 15 is supplied with hydrogen sulphide gas in part through the pipe 16 from the top of the chamber and in part through the pipe 18 connected to the reservoir or supply of fresh hydrogen sulphide gas. Sufficient gas is withdrawn through the pipe 20 to avoid a substantial decrease in the hydrogen sulphide concentration in the atmosphere in the chamber due to the building up of gaseous impurities therein.

The circulation of the liquid content of the precipitating chamber (initially the batch of zinc sulphate solution and then the slurry of zinc sulphide precipitate in zinc sulphate solution and sulphuric acid formed by the reaction between zinc sulphate and hydrogen sulphide) is continued until the zinc sulphate solution is exhausted, that is to say until the zinc present therein is reasonably completely precipitated as zinc sulphide. Good results have been obtained in a wide range of concentration of zinc sulphate solution, for example, from 15 grams of zinc (Zn) per liter to 207 grams of zinc per liter. It will generally be found that the velocity of circulation, that is to say the rate of functioning of the pump 5, must be greater for the higher zinc concentrations than for the lower concentrations, to yield finished pigment having the best optical properties such as tinting strength and color. With concentrations higher than about 100 grams of zinc per liter, it is difficult to obtain practical depletion (say 95%) of the zinc in the solution.

Fresh hydrogen sulphide gas should be supplied and sufficient hydrogen sulphide gas removed to maintain the desired partial pressure of hydrogen sulphide in the precipitating chamber. We generally prefer to employ a concentration of hydrogen sulphide of about 95% by volume or more at 1 atmospheric pressure during the initial stage of precipitation.

In a practical example of the invention carried out in the apparatus illustrated in the drawing where the precipitating chamber 1 was of 655 gallons capacity, the chamber was washed out to make certain of the absence of reaction products from the preceding operation, and was then filled with gas analyzing 95% $H_2S$ by volume. 600 gallons of purified zinc sulphate solution having a specific gravity of 1.072 at 35° C. (containing 30 grams Zn per liter) was then smoothly pumped into the tank from the bottom through the pipe 2. During this introduction of the zinc sulphate solution the gas outlet pipe 20 was kept open to permit the displacement of gas by the entering solution and a supply of fresh hydrogen sulphide was maintained in the tank. The valve 3 was then closed, and the pump 5 was started at such a rate as to supply zinc sulphate solution to the Venturi tube eductor (which was 4 inches in diameter) at a pressure of 20 pounds per square inch. At this pressure, the eductor delivered about 34 gallons of zinc sulphate solution (or slurry) per minute to the chamber 1 through its 14 mm. nozzle. The operation was continued until the 600 gallons of slurry were found to be adequately depleted. In this particular example, circulation was continued for 100 minutes and the crude zinc sulphate precipitate was found to have a settling rate of 40 cc. as determined by the test hereinafter described.

In a second practical example of the practice of the invention, the clean precipitating chamber was filled with gas analyzing 97% $H_2S$ by volume. 300 gallons of purified zinc sulphate solution of a specific gravity of 1.210 at 35° C. (containing 90 grams Zn per liter) was smoothly pumped into the bottom of the tank through the pipe 2. During this operation the gas outlet pipe 20 was kept open to permit the displacement of gas by the entering solution and a supply of fresh hydrogen sulphide was maintained to insure a concentration of 97% $H_2S$ in the gaseous atmosphere of the chamber. The valve 3 was then closed, and the pump 5 was started at such a rate as to supply zinc sulphate solution to each of two Venturi tube eductors 7 (each 6 inches in diameter) at a pressure of 32 pounds per square inch. At this pressure each of the eductors delivers about 75 gallons (and together about 150 gallons) of zinc sulphate solution (or slurry) per minute to the precipitating chamber through their 20 mm. nozzles. The operation was continued until the 300 gallons of slurry were found to be adequately depleted. In this example, circulation was continued for 80 minutes and the crude zinc sulphide precipitate was found to have a settling rate of 10 cc. as determined by the test hereinafter described.

Zinc sulphide pigment of excellent quality was obtained from both of the crude zinc sulphide precipitates produced in the foregoing examples when finished by conventional practices.

The present invention is not restricted to the use of a Venturi tube eductor for effecting the mixing of the zinc salt solution with hydrogen sulphide gas. Any efficient means of producing a vigorous spray of zinc salt solution in an atmosphere of hydrogen sulphide gas may be employed in practicing the invention. Thus, the contemplated mixing may be effected by delivering a jet of zinc salt solution against a baffle positioned in the precipitating chamber above the liquor or slurry level therein. A rotary disk may, for example, be advantageously employed as the baffle. With such an equipment, fresh hydrogen sulphide gas is introduced into the precipitating chamber at a point in the neighborhood of the jet and baffle. Moreover, a Venturi tube eductor may be effectively used in practicing the present invention without the supply of hydrogen sulphide gas to the eductor. In other words, the Venturi tube eductor may be used simply as an efficient means of producing a highly atomized spray of zinc salt solution (or slurry) in the hydrogen sulphide atmosphere in the precipitating chamber.

The settling properties of the crude zinc sulphide precipitate are determined as follows:—

A sample of 500 cubic centimeters of the slurry of crude precipitate is taken before aging. This slurry is observed for ten minutes in a graduated cylindrical vessel approximately 1⅞ inches in diameter. The volume (depth) of clear supernatant liquor above the settling precipitate at the end of ten minutes is a measure of the settling rate. The greater this volume (expressed in cubic centimeters) the more rapid or higher the settling rate.

Slow settling crude precipitates yield on drying a hard crude cake. Rapid settling crude precipitates yield on drying a soft crude cake. The present invention contemplates the production of a relatively slow settling precipitate, for example 5 to 50 cc. as measured by the foregoing test.

In general, any condition that tends to facilitate the precipitation reaction tends at the same time, other factors being the same, to produce a slower settling precipitate (a harder crude cake), and a finished zinc sulphide pigment with high tinting strength. Thus, other factors remaining the same, the settling rate may be decreased by (1) increasing the rate of circulation of the slurry, (2) increasing the concentration (i. e. partial pressure) of hydrogen sulphide in the gaseous atmosphere through which the circulating slurry is sprayed, (3) increasing the pH value of the solution or slurry, (4) increasing the temperature of the solution or slurry, or (5) increasing the concentration of zinc salt in the initial solution. In controlling the settling rate of the crude zinc sulphide precipitate by the application of the principles herein described, it may be noted that the control of the precipitation of the first moiety of zinc in the solution is the most important for determining the ultimate characteristics of the crude precipitate.

The settling rate of the crude precipitate and the time required for depletion of the zinc salt solution may be controlled to a limited extent by regulating the velocity of circulation, that is to say the pumping volume of pump 5 in the apparatus illustrated in the drawing. The greater the velocity of circulation, the more rapidly the batch of zinc salt solution is depleted and the slower the resulting crude precipitate settles. Vice versa, the time required for depletion and the settling rate of the crude precipitate may be increased if desired by decreasing the circulation rate. However, other variables than circulation rate have a significant effect on the time required for depletion and on the settling rate, and thus under conditions of abnormally slow or abnormally rapid circulation rates, appreciable changes in circulation rates may not have significant effects on the time required for depletion or on the settling rate.

The settling rate of the crude precipitate and the time required for depletion may be decreased by increasing the partial pressure of the hydrogen sulphide gas in the precipitating chamber. For example, if the partial pressure of hydrogen sulphide gas is maintained at about 95% of an atmosphere, the settling rate of the crude precipitate will be slower and the time required for depletion will be less than the settling rate of the crude precipitate and the time required for depletion in an operation where the partial pressure of hydrogen sulphide gas is maintained at one-half of an atmosphere, other things being equal.

The addition of a small amount of acid to the zinc salt solution (thereby lowering the pH value of the solution) will increase the settling rate of the crude zinc sulphide precipitate and the time required for depletion, other conditions being the same. For example, if sufficient sulphuric acid is added to a zinc sulphate solution to make a solution of 0.02 normal strength, the settling rate of the crude precipitate and the depletion time will exceed the settling rate and depletion time in an operation in which the zinc sulphate solution contains no free acid, other things being equal. Accordingly, the settling rate and the depletion time may be decreased by the addition to the zinc salt solution of agents that increase its pH value, such for example as zinc oxide, sodium hydroxide, or other suitable bases.

If the temperature of the zinc salt solution is increased, the time required for depletion will be shortened and the settling rate of the crude precipitate will be decreased.

The concentration of zinc in the initial zinc salt solution affects the settling rate of the crude precipitate and the depletion time. Thus, employing the zinc sulphate solution specified in the foregoing Example 1 (30 grams of Zn per liter) the settling rate will be maintained between 15 cc. and 40 cc. and the time required for depletion from 15 minutes to 120 minutes. With the zinc sulphate solution specified in the foregoing Example 2 (90 grams of Zn per liter) the settling rate will be maintained between 5 cc. and 15 cc. and the time required for depletion from 40 minutes to 180 minutes. As the concentration of zinc is further increased above 90 grams per liter, there will be little change in the settling rates, and indeed little significance in the determinations because of the high percent of solids in the slurry. However, with zinc sulphate solutions containing more than 90 grams of zinc per liter, the time required for depletion will generally be somewhat greater. It will be noted that, whereas in general any factor that decreases the depletion time lowers the settling rate, an increase in zinc concentration, on the contrary, increases the depletion time and lowers the settling rate. This lower settling rate occurring with increasing zinc concentrations is probably due to the higher percent of solids in the finished slurry.

Ordinarily a crude precipitate with a faster settling rate and longer depletion time than hereinbefore indicated as suitable in the practice of the present invention produces a very soft finished product with inferior tinting strength, and a crude precipitate with a slower settling rate and a shorter depletion time than hereinbefore indicated as suitable in the practice of the present invention produces a very hard cake that is difficult to grind. These difficulties, however, do not necessarily preclude in every case the advantageous production of crude precipitates with settling rates or depletion times outside the limits hereinbefore indicated as suitable in the practice of the present invention.

It will be understood that in every case the settling rate in question is that of the initial crude precipitate; that is, the crude precipitate as formed, before aging or other subsequent treatment, and the time required for depletion is the elapsed time from the start of circulation (vigorous spraying) until a reasonably complete (such as 90 to 95 percent) precipitation (as zinc sulphide) of the zinc present in the initial solution has been accomplished.

It is to be understood that various modifications may be made in the procedures hereinbefore described for the practice of the invention. Thus, the formation of substantial amounts of acid and zinc sulphide in the initial zinc salt solution by a slow reaction during the charging of the batch solution into the precipitating chamber and before the start of vigorous mixing may be prevented by first filling the chamber with an inert gas, then pouring the zinc salt solution into the chamber through the inert gas atmosphere therein, and finally displacing the inert gas by introducing hydrogen sulphide into the chamber in such fashion as not to agitate the zinc salt solution or drive bubbles of hydrogen sulphide gas therethrough. It will of course be understood that the size of the precipitating chambers given in the foregoing examples is no part of the invention. Equally good results have been obtained in practicing the invention with 10 gallon batches in 25 gallon tanks and batches as large as 1000 gallons or more may be satisfactorily used.

We claim:

1. In a batch process in which a zinc salt solution is atomized in a container with hydrogen sulphide to form zinc sulphide precipitate, at least a portion of the hydrogen sulphide being present in the container prior to the introduction of the zinc salt solution, the improvement which comprises introducing the zinc salt solution into the container so that the surface of the resulting pool of the solution in the container rises but is otherwise substantially undisturbed, whereby the entering solution is afforded little opportunity for reaction with the hydrogen sulphide gas in the container, and thereafter subjecting the solution and the gas to vigorous admixture in a zone above said surface.

2. Process in accordance with claim 1 in which the zinc salt solution is introduced through the bottom of the container.

3. Process in accordance with claim 1 in which after introduction of the pool of solution into the container, the solution is repeatedly sprayed through the hydrogen sulphide gas until the zinc salt content of the solution has been depleted to the desired extent, and the settling rate of the resulting crude zinc sulphide precipitate is controlled to obtain, a relatively slow settling precipitate by regulating at least one of the following factors: (1) the velocity of the circulation of the liquid content of the container, (2) the concentration of the hydrogen sulphide through which the liquid is sprayed, (3) the pH value of the circulating liquid, (4) the temperature of the circulating liquid, and (5) the zinc content of the initial zinc salt solution.

4. Process according to claim 1 in which said container, prior to the introduction of the pool of solution thereinto, is substantially freed of zinc sulphide produced in a preceding similar precipitating operation.

5. Process according to claim 1 in which the zinc salt solution is repeatedly sprayed by a Venturi tube eductor through the hydrogen sulphide gas in the container.

LEWIS COVELL COPELAND.
JOHN REID STONE.

CERTIFICATE OF CORRECTION.

Patent No. 2,130,382. September 20, 1938.

LEWIS COVELL COPELAND, ET AL.

It is hereby certified that error appears in the printed specification of the above numbered patent requiring correction as follows: Page 2, first column, line 16, for "viorous" read vigorous; and line 17, for "it" read its; page 3, first column, line 6, for the numeral "100" read 110; and line 64, for "delivers" read deliver; page 5, first column, line 1, claim 3, after "obtain" strike out the comma; and that the said Letters Patent should be read with this correction therein that the same may conform to the record of the case in the Patent Office.

Signed and sealed this 25th day of October, A. D. 1938.

Henry Van Arsdale (Seal) Acting Commissioner of Patents.